(No Model.) 2 Sheets—Sheet 1.
C. P. ALEXANDER.
COMBINED FLOUR AND MEAL BIN AND SIFTER.
No. 567,062. Patented Sept. 1, 1896.
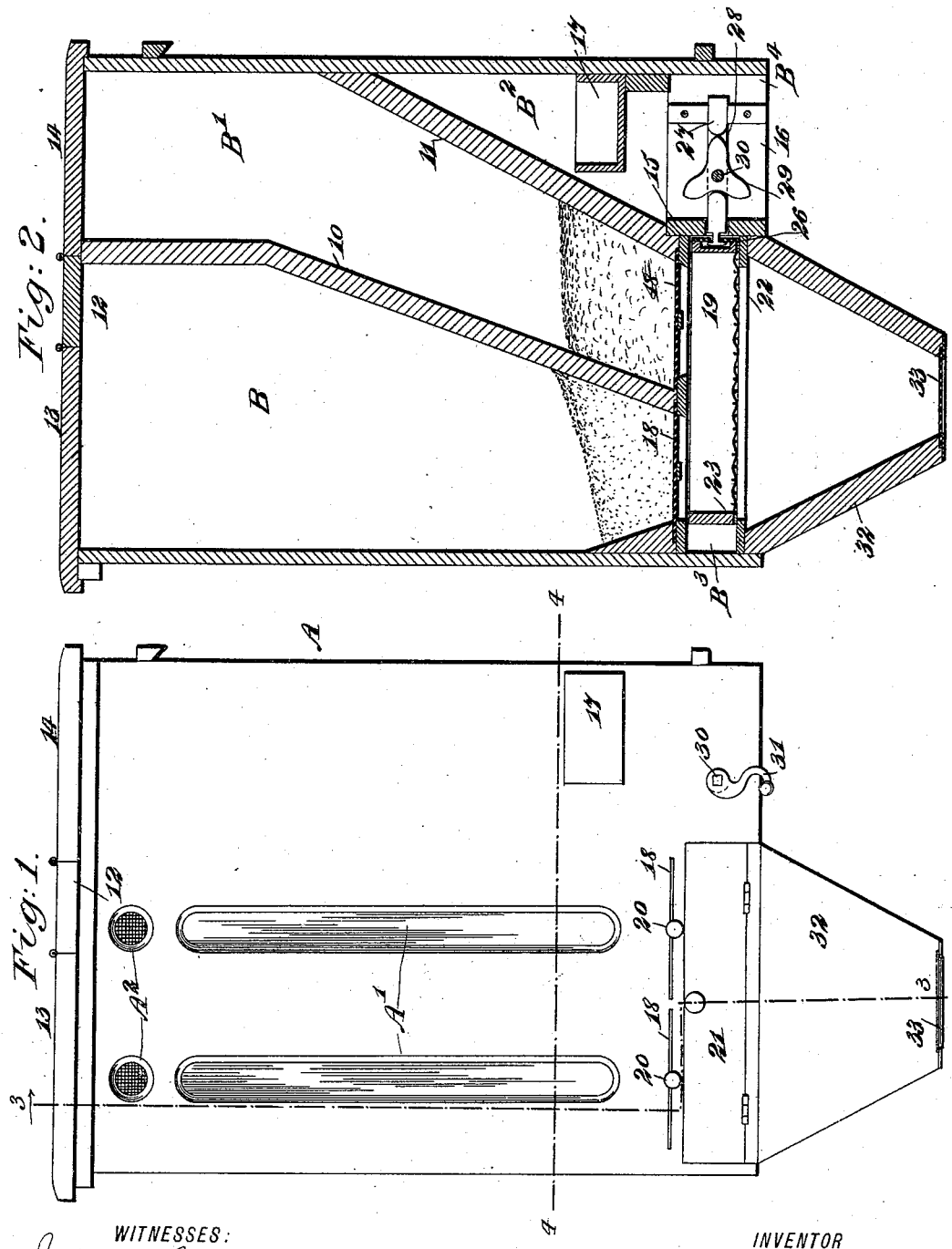
WITNESSES:
John A. Rennie
Fred Acker
INVENTOR
C. P. Alexander
BY
Munn & Co.
ATTORNEYS.

(No Model.) 2 Sheets—Sheet 2.
C. P. ALEXANDER.
COMBINED FLOUR AND MEAL BIN AND SIFTER.
No. 567,062. Patented Sept. 1, 1896.
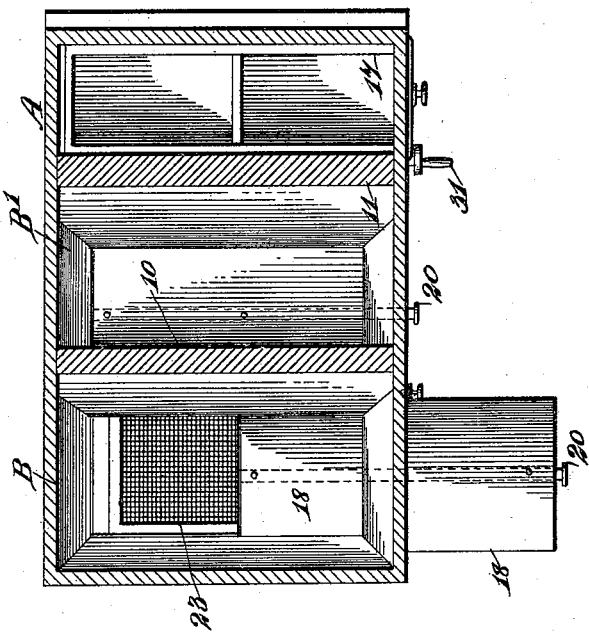
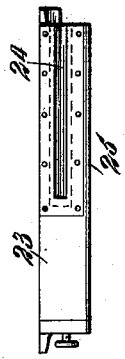
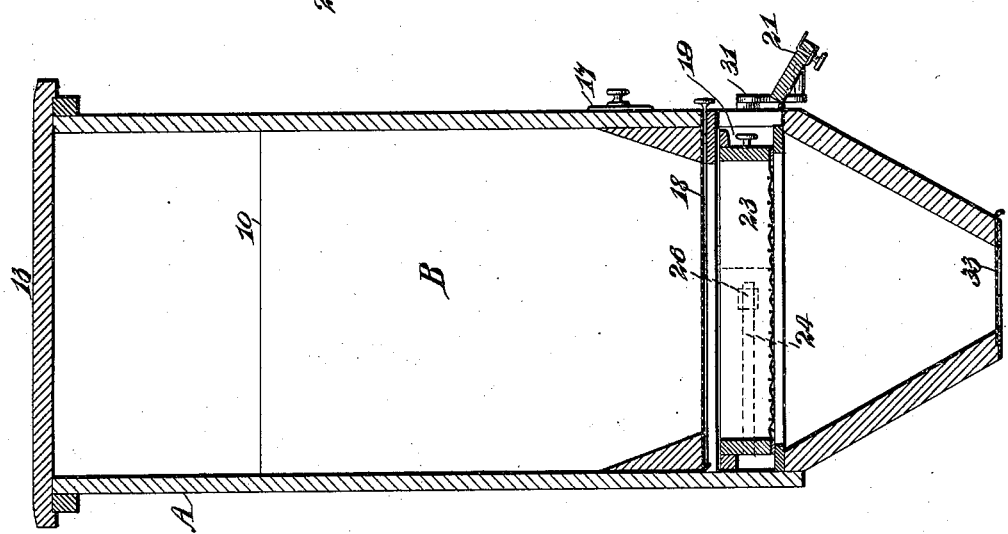
WITNESSES:
INVENTOR
C. P. Alexander
BY
Munn & Co.
ATTORNEYS.

UNITED STATES PATENT OFFICE.

CHARLES P. ALEXANDER, OF CLEBURNE, TEXAS.

COMBINED FLOUR AND MEAL BIN AND SIFTER.

SPECIFICATION forming part of Letters Patent No. 567,062, dated September 1, 1896.

Application filed September 7, 1895. Serial No. 561,722. (No model.)

*To all whom it may concern:*

Be it known that I, CHARLES P. ALEXANDER, of Cleburne, in the county of Johnson and State of Texas, have invented a new and Improved Combined Flour and Meal Bin and Sifter, of which the following is a full, clear, and exact description.

My invention relates to kitchen furniture; and it has for its object to provide an article of furniture in which will be combined a flour and meal bin and a sifter and a mechanism for agitating the sifter and a further object of the invention is to provide a means whereby any desired quantity of flour or meal may be delivered to the sifter, and whereby, furthermore, the sifter may be removed for cleaning purposes or for purposes of repair whenever necessary and conveniently and expeditiously replaced.

Another object of the invention is to provide a means for directing the sifted material to a receptacle, and likewise for closing the outlet end of the delivery-chute.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved article of kitchen furniture. Fig. 2 is a longitudinal vertical section through the same, taken at a central point. Fig. 3 is a transverse vertical section taken substantially on the line 3 3 of Fig. 1. Fig. 4 is a horizontal section taken substantially on the line 4 4 of Fig. 1, and Fig. 5 is a detail side elevation of the sifter removed from the cabinet.

In carrying out the invention the body A of the cabinet is preferably made somewhat rectangular in cross-section, and it is divided at a point near the center and in a vertical direction by a partition 10, extending from the top substantially to the bottom portion of the cabinet. The said partition is straight at the top and is given a decided inclination in direction of one side of the cabinet from a point near the top to its bottom extremity, and a second partition 11, inclined substantially in a corresponding manner to the inclined portion of the partition 10, is secured in the cabinet back of the latter partition, as is best shown in Fig. 2, and these partitions preferably extend from the front to the back of the cabinet. Under this construction of the interior of the cabinet two bins B and B' are formed, one for the reception of flour and the other for the reception of meal or other crushed cereals, and a third compartment B² is likewise obtained, as is also shown in Fig. 2, much smaller than either of the bins B and B'. A cross-bar 12 forms a portion of the top of the bins, and two covers 13 and 14 are hinged to this cross-bar, one covering the upper portion of each bin.

The partitions, as heretofore stated, do not extend to the bottom of the cabinet, thus forming a lower horizontal chamber B³, and the bins being open at the bottom communicate directly with this chamber. The chamber is practically the width of the said two bins only, its inner wall comprising a short vertical partition 15, whereby a second lower chamber B⁴ is formed, and this chamber is divided by a partition 16 being placed parallel with the front and back.

Within the upper compartment B² one or more drawers 17 may be placed, opened from the front of the said cabinet, and at the bottom of each bin slideways are made in their side walls, and a slide 18 is adapted to normally close the bottom of each of the bins. These slides are preferably of metal and are usually strengthened by a longitudinal central stay-bar 19, and the slides extend outward through openings made in the front of the cabinet and are provided with knobs or handles 20 upon their outer ends.

The front of the chamber B³ is ordinarily closed by a door 21, adapted to drop downward, and the said chamber is provided with a marginal horizontal flange 22 at its bottom, upon which flange a sieve 23 is made to rest, the sieve being of less size than the size of the chamber, so that it may have laterally-reciprocating movement therein; but the sieve is of sufficient size, however, to extend below the slides 18 of each of the bins. The sieve is readily removable from the chamber B³. Therefore, it may be conveniently repaired and kept clean. At one side, preferably the inner side, of the sieve, or that side which is next to the bottom chamber B⁴, it is provided with a longitudinal groove 24 in its side surface, the groove being protected by a wear-plate 25, which extends some distance over the groove at the top and bottom, rendering said groove substantially T-shaped in cross-section, and the groove is open at the back of the sieve and closed near its forward end. The groove of the sieve is adapted to receive the T-head 26 of an agitating-bar 27, which is held to slide in suitable bearings parallel with and against the partition 16 in the chamber B⁴, as shown in Fig. 2. This agitating-bar is provided with a longitudinal slot 28, the end walls of the said slot being convexed, as shown in Fig. 2. Within this slot a trefoil cam 29 is mounted to revolve, the said cam being fast on the inner end of a shaft 30, which shaft extends out at the front of the cabinet and has attached thereto preferably a crank-handle 31, as illustrated in Fig. 1.

The sieve having been attached to the trefoil cam, it is evident that as said cam is revolved the agitating-bar will be given a lateral intermittent reciprocating movement, which will be imparted directly to the sieve, causing the sifting of the material which the sieve may contain, and the sifted material is directed to any suitable receptacle through the medium of, preferably, a funnel-shaped chute 32, secured below the chamber B³ in which the sieve has movement, and a slide 33 is provided to normally close the bottom of the chute, in order to prevent insects from gaining access to the bins or to the sieve. It is evident that any desired quantity of material may be fed to the sieve from either bin by simply drawing out one or the other of the slides 18, as shown in Fig. 4, and the said slides may be manipulated with one hand. It is furthermore evident that, owing to the peculiar shape of the bins, namely, the decided incline given them throughout the greater portion of their length, the material contained in the bins will be fed in a cleanly manner to their bottom slides. The bin is provided with glass plates A', covering vertically-elongated slots in one side of the bin, and by means of which the condition of the flour within the bin may be discerned. I also provide sieve-covered openings A² for the purpose of ventilation. It will be observed that the sieve 23, being in close proximity to the bin, will never be filled beyond its capacity, and by these means overflow of the sieve is prevented.

Having thus described my invention, I claim as new and desire to secure by Letters Patent—

1. A combined flour and meal bin, comprising a body divided by the partitions 10 and 11, forming the bins B B', and the compartment B² at one side of the bin B' and smaller than the said bins, the said partitions terminating short of the bottom of the body, whereby a horizontal chamber B³ is formed below the bins, said chamber having a door in one side, slides above the said horizontal chamber, a sieve fitting loosely in the said chamber so as to reciprocate therein, and a reciprocating bar in the compartment B² and having one end projecting into the chamber B³ and detachably secured to the sieve, substantially as described.

2. A combined flour and meal bin, comprising a body formed with two bins, a compartment at one side of the lower portion of one bin, and a chamber below the said bins, slides in the bottoms of the bins, a sieve in the said chamber and having a dovetail groove in one side, said groove being open at one end, a reciprocating bar in the said compartment and provided with a head projecting into the said chamber and engaging the groove of the sieve, and means for reciprocating said bar, substantially as described.

3. In a bin and sifter, the combination with a body having a chamber in its lower portion, and a door for said chamber, of a sieve in the said chamber and provided with a dovetail groove open at one end, and a reciprocating bar projecting into the chamber and provided with a head engaging the groove of the sieve, whereby the sieve can be attached or detached from the said bar by sliding it in or out of the chamber, substantially as described.

4. In a bin and sifter, the combination with a body provided with two bins, a compartment at one side of the lower portion of one bin, and a chamber below the bins, of a sieve in the chamber and provided with a dovetail groove in one side, said groove being open at one end, a slotted sliding bar in the compartment of the body and provided with a head projecting into the said chamber and engaging the groove of the sieve, and a cam mounted on a shaft in the said compartment and working in the slot of the said bar, said shaft being provided with a handle at one end, substantially as described.

CHARLES P. ALEXANDER.

Witnesses:
E. B. STONECIPHER,
L. M. LAYTON.